United States Patent Office 3,299,029
Patented Jan. 17, 1967

3,299,029
POLYMER COMPOSITION AND PREPARATION
Frederik L. Binsbergen and Pieter W. O. Wijga, both of Amsterdam, Netherlands, assignors to Shell Oil Company, New York, N.Y., a corporation of Delaware
No Drawing. Filed June 14, 1963, Ser. No. 287,758
Claims priority, application Netherlands, June 18, 1962, 279,855
20 Claims. (Cl. 260—93.7)

This invention relates to improved crystallization methods for the production of composites of solid crystalline olefin polymers with crystallization modifying additives, and to methods of preparing such additives and of incorporating them in the polymers. The methods of this invention result in the production of modified polyolefins having improved physical properties.

The invention relates more specifically to an improvement in a crystallization method for the production of shaped articles, and of resin composites suitable for use in producing shaped articles, from resins consisting substantially of crystallizable olefin polymers, particularly those produced from alpha-monoolefins in the presence of low pressure catalysts of the Ziegler-Natta type. The invention is of outstanding advantage when used with isotactic polypropylene and will be illustrated largely with reference thereto.

Solid polypropylene is a new thermoplastic polymer which has recently achieved commercial importance. By use of appropriate conditions and catalysts it can be produced in a sterically regulated form known as isotactic polypropylene. It is difficult, if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. In general, polypropylene having a crystallinity of this order contains at most only a very small proportion of material which is extractable in non-aromatic hydrocarbons such as gasoline boiling range hydrocarbons. Typically, the proportion of highly crystalline polypropylene which is extractable in boiling heptane or iso-octane is less than 10% and usually less than 5%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though olefin polymers of 100 percent crystal structure are not known to exist. For example, a crystallinity of 70% is extremely high for isotactic polypropylene. Normally solid, crystalline polypropylene usually has a viscosity average molecular weight of at least about 40,000 and generally between 100,000 and 1,200,000. For convenience the molecular weight is usually expressed in terms of intrinsic viscosity. The intrinsic viscosity of polypropylene, measured in decalin at 150° C., is generally between 1.0 and 6 dl./g. but may be as low as 0.5 or less and as high as 10 or more.

Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as haze in thin films and as translucency, decreasing to ultimate opacity in articles of progressively increased thickness. Another disadvantage of the usual forms of highly crystalline polypropylene is a relatively low impact resistance. This handicaps the use use of isotactic polypropylene for making vessels or containers which during use may be subject to mechanical shock.

Polypropylene, like many other crystalline polymers, crystallizes from a melt in a form in which the individual crystals are associated in spheroid or ellipsoid bodies known as spherulites. Generally, clarity and some mechanical properties of articles made from polypropylene are better when the spherulites are relatively small.

It has been proposed in the past to add certain finely divided insoluble solid materials, such as silica, to polyethylene to improve the clarity of the polymer. In another instance it has been proposed to add insoluble solids such as silica to improve polymer properties related to the rate of crystallite and spherulite growth. It has also been suggested to add related polymers.

It was recently found, as disclosed in copending application U.S. Serial No. 160,303, filed December 18, 1961, by Michael Wales, now U.S. Patent No. 3,207,737, that certain members of an entirely different class of materials can be used as additives to modify the crystallization process and thereby provide substantial improvements in physical properties of solid polypropylene and in mechanical properties of articles produced therefrom, especially those properties which are related to crystallite and spherulite structure of the polymer. Similar improvements of other crystallizable polymers may be obtained by use of additives of the same type. In many instances minute amounts of the additives are extremely effective in modifying the crystallization process and crystal structure.

The materials which result in the production of solid polypropylene of improved physical properties when used according to said invention are typically salts of aluminum and of carboxylic or polycarboxylic acids selected from certain limited groups, said salts having been prepared in a manner specified hereinafter. For brevity, this group of compounds will sometimes be referred to herein as "aluminum salts of carboxylic acids," or, more briefly, as "carboxylic acid salts." Effective compounds of this type are identified in detail in said Wales patent, the pertinent disclosures of which are incorporated herein by reference.

The complex aluminum salts of said copending application are particularly adapted to be used in polymers which contain only very low residues of polymerization catalyst, e.g., less than 50 p.p.m. calculated as the corresponding metal, and especially in polymers which contain 0–10 p.p.m. of such residues. This invention provides an improved method for producing composites of such highly purified polymers with said carboxylic acid salts of aluminum.

It is thus an object of this invention to provide an improved method for the production of composites of crystallizable polymers such as linear polymers of alpha-monoolefins, and particularly polypropylene, with crystallization modifying additives, particularly aluminum salts of certain carboxylic acids.

Other objects will become apparent from the following description of this invention.

According to this invention, solid crystalline polypropylene and other similar solid crystalline polymers of substantially improved physical properties are prepared by carrying out at least the final crystallization from a melt comprising the normally solid, crystallizable polypropylene or other polymer, together with a small, effective amount of at least one of said compounds of the type of aluminum salts of carboxylic acids, said compound having been formed by reacting an aluminum compound and one of said carboxylic acids in the presence of said polyolefin.

In another aspect, this invention comprises improved articles of solid crystalline polypropylene or other similar solid crystalline polymers, prepared by crystallizing a melt of crystallizable normally solid polypropylene or other similar polymer, containing a small, effective amount of at least one of said compounds of the type of aluminum salts of carboxylic acids, said compound having been formed in the presence of said polyolefin.

Several properties of the articles produced from normally solid crystalline polymers according to this invention are improved thereby. The improvement will vary, depending on the particular polymer used, other additives used therewith, the particular compound selected from the group of compounds of the type of aluminum salts of carboxylic acids, and the conditions under which the final solidification of the melt takes place.

Generally, it is found that the spherulite dimensions in the crystallized articles produced according to this invention are substantially smaller than they would be in an article produced in identical manner from the same polymer but without using one of said aluminum salts of carboxylic acids.

It is also generally found that the clarity of film or of thicker shaped articles produced from compositions according to this invention is substantially improved, compared to that of articles produced in identical manner from the same polymer without one of said aluminum salts of carboxylic acids, particularly when the final cooling step is under non-flow conditions.

The modulus of elasticity of polymer produced according to this invention generally is increased over that of the identical polymer crystallized in identical manner without one of said aluminum salts of carboxylic acids. Similarly, tensile strength and other tensile properties are improved.

One of the advantages of this invention is that injection molding of polypropylene containing an aluminum salt of a carboxylic acid in accordance with this invention can be successfully carried out over a much wider range of temperature and pressure conditions than in the absence of crystallization modifying compounds.

The area of a "molding diagram," for modified polymer, i.e., the area on the plot of cylinder temperature vs. ram pressure which covers satisfactory conditions, is typically more than twice that obtained with unmodified polymer.

Another advantage is that the mixtures according to this invention solidify at a higher temperature than those of otherwise identical polymers not containing said aluminum salts of carboxylic acids. Hence, processing can generally be carried out in a shorter period of time. Another advantage of this invention is that it is possible to apply the process to highly crystalline polymers which have a relatively high melt index, allowing their being processed at lower temperatures.

It is further often found that impact resistance is greater in articles produced according to this invention than in those identically produced from identical polymer without one of said aluminum salts of carboxylic acids, particularly when the final cooling step is under non-flow conditions.

Not all salts of aluminum with carboxylic acids are effective in modifying the crystal structure of polypropylene upon cooling from a melt. For example, no benefit is obtained when aluminum salts of monocarboxylic alkanoic acids are used.

*Carboxylic acids*

The carboxylic acids whose aluminum salts are effective in accordance with this invention can be broadly classified into two main groups, one of which includes two subgroups, as follows:
  (A) Di- and polycarboxylic acids (sometimes referred to herein for brevity as dicarboxylic acid type compounds).
  (B) Monocarboxylic acids which contain ring structures.
    (1) Monocarboxylic acids having the carboxyl group attached to a ring carbon atom (sometimes referred to herein, for brevity, as benzoic acid type compounds).
    (2) Monocarboxylic acids having the carboxyl group attached to an aliphatic carbon atom and a ring attached to another aliphatic carbon atom (sometimes referred to herein, for brevity, as arylalkanoic acid type compounds).

Suitable compounds of each of these groups, whose aluminum salts are useful in this invention, are set out below. In general, salts of acids from group B(1) are most preferred for use in this invention, and those of acids from group A least preferred. However, the effectiveness of individual members of each group varies.

(A) *Dicarboxylic acid type compounds*

The group of dicarboxylic acid type compounds whose aluminum salts are suitable for use in accordance with this invention includes saturated aliphatic dicarboxylic acids, preferably having at least 4 carbon atoms per molecule, saturated cycloaliphatic dicarboxylic acids and aromatic dicarboxylic acids. Among the dicarboxylic acid salts, those of saturated aliphatic dicarboxylic acids having up to 12 carbon atoms per molecule are generally preferred. In general, use of these salts results in improved impact resistance.

Useful improvements are obtained, for example, with aluminum salts of acids of 4 to 12 carbon atoms, e.g., of succinic, glutaric and adipic acid and with those of the higher acids having even numbers of carbon atoms per molecule, such as suberic, sebacic, and tetramethyladipic acid. Salts of succinic, glutaric, adipic and tetramethyl adipic acid are particularly adapted to provide improvements in polymer clarity.

Good results are also obtained with aluminum salts of saturated cycloaliphatic dicarboxylic acids, such as cis-1,4-cyclohexanedicarboxylic acid, 1,2-cyclohexanedicarboxylic acid and 1,1-cyclohexanedicarboxylic acid.

Aromatic dicarboxylic acids whose aluminum salts provide useful results include orthophthalic acid, metaphthalic acid and tetramethylterephthalic acid.

Other useful dicarboxylic acids include aryl-substituted aliphatic dicarboxylic acids such as paraxylyl succinic acid and 3-phenylbutanedicarboxylic acid.

Some improvement in polymer properties is also obtained when aluminum salts of polycarboxylic acids having more than two carboxylic acid groups per molecule are used, e.g., of pyromellitic acid.

(B)    (*1*) *Benzoic acid type compounds*

The group of benzoic acid type acids whose aluminum salts are suitable for use in accordance with this invention includes benzoic acid itself, hexahydrozenboic acid (cyclohexanecarboxylic acid), and substituted benzoic and hexahydrobenzoic acids. All the acids of this group have in common that they are carbocyclic monocarboxylic acids whose carboxyl group is attached to a carbocyclic nucleus, which may be aromatic or cycloaliphatic. The group of benzoic acid type compounds further includes heterocyclic monocarboxylic acids whose carboxyl group is attached to a ring carbon atom.

Suitable substituted benzoic, hexahydrobenzoic and heterocyclic acids include those having one or more hydro carbon groups substituted on the nucleus. Preferred are those with 1 to 6 carbon atoms per substituent groups, preferably those with alkyl substituents; cycloalkyl and aryl substituents may also be present. Typical useful alkyl substituted benzoic acids are o-methylbenzoic acid, p-methylbenzoic acid, p-ethylbenzoic acid, p-isopropylbenzoic acid, p-tert.butylbenzoic acid and, o-tert.butylbenzoic acid. The aluminum salts of para-alkyl substituted benzoic acids are particularly preferred. Improvements which are generally of a lower order of magnitude are obtained with aluminum salts of benzoic acids having two or more alkyl substituents in the nucleus, such as 2,4-dimethylbenzoic acid and 2,4,6-trimethylbenzoic acid. Improvements of a lower order are also obtained with aluminum salts of benzoic acids having relatively large alkyl substituent groups such as, for example, p-n-heptylbenzoic acid. Benzoic acids whose aluminum salts are effective may also have the acid carrying benzene ring condensed with another benzene ring, such as in alpha or beta naphthoic acid, or they may have a cyclohexyl ring substituted on the benzene ring, as in p-cyclohexylbenzoic acid.

Aluminum salts of alicyclic compounds corresponding to the above aromatic compounds can be used. Suitable carbocyclic acids are, for example, cyclohexane carboxylic acid, 1-methylcyclohexane carboxylic acid, cis-4-tert.butylcyclohexane carboxylic acid, cis-4-neopentylcyclohexane carboxylic acid, trans-4-methylcyclohexane carboxylic acids and trans-4-tert.butyl cyclohexane carboxylic acid, and 1-methyl-cyclohexene-3 carboxylic acid. Heterocyclic acids include 2-furane carboxylic acid (pyromucic acid) and gamma-pyridine carboxylic acid (isonicotinic acid).

Also useful are aluminum salts of cyclic monocarboxylic acids containing a polar group or atom substituted on the nucleus, e.g., a hydroxy-, alkoxy-, amino, nitro, or esterified carboxyl-group or a halogen atom. These polar groups or atoms may occur on the nucleus either as the sole substituent or together with one or more hydrocarbon group substituents. Generally, the aluminum salts of those compounds in which a substituent is para to the carboxyl group are the most effective. Typical examples of this group are: m-hydroxybenzoic acid, p-hydroxybenzoic acid, o-chlorobenzoic acid, p-chlorobenzoic acid, m-nitrobenzoic acid, 3,5-dinitrobenzoic acid, o-aminobenzoic acid, p-aminobenzoic acid, p-acetamidobenzoic acid, o-formylbenzoic acid, p-methoxybenzoic acid, and mono-methylterephthalate. Less effective are salicyclic acid (o-hydroxybenzoic acid), o-mercaptobenzoic acid, m-chlorobenzoic acid, p-nitrobenzoic acid, 3-methylsalicyclic acid, dichlorosalicyclic acid, 2,5-dichlorosalicyclic acid, 2,5-dihydroxybenzoic acid and 3,5-dihydroxybenzoic acid.

(B) (2) *Alkanoic acid type compounds*

The group of arylalkanoic acid type compounds whose aluminum salts are suitable for use in accordance with this invention includes as preferred group aryl alkanoic acid salts. Particularly preferred and typical compounds are monophenylacetic acid and diphenylacetic acid.

The effective arylalkanoic acid type compounds may be represented by the general formula

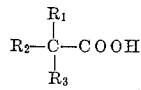

in which $R_1$ is an aryl, arylalkyl, arylalkenyl, cycloalkyl, cycloalkalyl or cycloalkalkenyl group wherein the ring does not itself contain a carboxylic acid group. $R_2$ and $R_3$ may also be substituents of the type $R_1$ or they may be aliphatic hydrocarbon groups or hydrogen. The compounds included in this group may therefore be generically designated carbocyclic ring-substituted acetic acids or carbocyclic ring-substituted aliphatic monocarboxylic acids having the carboxyl group attached to a terminal aliphatic carbon atom. The preferred acids contain from 8 to 25 carbon atoms, including from 1 to 4 carbon atoms in the alkyl group attached to the carboxyl group. The carbocyclic ring-substituted acetic acids may also carry as substituents a hydroxyl group, an amino group or a halogen atom.

Particularly effective among the salts of mono- or polyphenyl substituted aliphatic terminal carboxylic acids are the aluminum salts of phenyl acetic acid, diphenyl acetic acid, beta,beta-diphenylpropionic acid and beta-phenyl-beta-methylbutyric acid.

Other useful additives of this group are aluminum salts of alpha-phenyl-alpha-methylpropionic acid, beta,beta,beta-triphenylpropionic acid, beta,beta,beta-tri(p-tert.butylphenyl)propionic acid, beta-p-tolyl-beta-methylbutyric acid, and cinnamic acid.

The aryl nuclei acting as substituents may themselves be substituted, as in p-nitrophenylacetic acid, beta-(p-aminophenyl)beta-methylbutyric acid, and beta - (p-nitrophenyl)beta-methylbutyric acid.

Other suitable acids of this group carry hydroxyl, amino or halogen substitution in the aliphatic chain as in beta,beta-di(p-tert.butylphenyl) - alpha-hydroxypropionic acid and in benzilic acid (diphenylglycolic acid).

Cycloalkyl substituted alkanoic acids include, for example, cyclohexylacetic acid, beta-cyclohexylpropionic acid and beta-cyclohexylbutyric acid.

*Aluminum compounds*

The aluminum compounds employed in preparing the aluminum salts of carboxylic acids are preferably basic aluminum compounds, in particular aluminum hydroxides, or aluminum compounds derived from acids weaker than the carboxylic acids used. Very suitable compounds also include those containing one or more OR groups bound to aluminum wherein R represents a hydrocarbon group. Aluminum alkoxides having lower alkyl groups are especially suitable, e.g., aluminum compounds which contain either one or two OR groups and correspondingly two or one OH groups bound to aluminum. Aluminum trialkoxides are preferred, and aluminum tri-isopropoxide is especially preferred. R suitably has 2 to 8 carbon atoms.

The carboxylic acid salts of aluminum are effective in very low concentrations and are preferably used in such low concentrations. Suitable concentrations are in the range from 0.001 to 1 percent by weight. The most effective compounds are preferably employed in concentrations below 0.5 percent, e.g., between 0.001 and 0.3 or up to 0.5 percent. Other compounds may be used in amounts up to 1 percent. Although still higher concentrations, e.g., up to 5%, may be used no further benefit of the kind described is generally obtained thereby.

Most of the preferred additives have aluminum contents in or near the range from 5 to 10 percent by weight. The amount of aluminum added to the polymer in the preparation of said aluminum salts in the preferred concentrations is generally in the range from 0.0005 to 0.05 percent by weight. When it is desired to produce a low ash polymer, the aluminum content may be held in the range from 0.0005 to 0.005, when a substantially ash-free substrate is employed.

In the preparation of aluminum salts of carboxylic acids according to this invention, the amount of aluminum added as a compound reactive with carboxylic acid is at least 0.0005 percent by weight, based on polymer. The amount of carboxylic acid added is preferably the stoichiometric equivalent of the amount of aluminum.

The process of this invention may be carried out with a single crystallization modifying compound of the type described, or with a mixture of two or more of such compounds.

If desired, other additives may be present in the olefin polymer. Crystallization modifying additives of other types may be added. Other additives, which are conventionally added, include antioxidants, stabilizers against ultraviolet radiation, and the like. They may be added at any convenient stage of processing.

The present invention is advantageous when used with clear, unpigmented, unfilled polymers. However, the additives of this invention are also compatible with conventional fillers and pigments.

While this invention is most advantageous in providing improved articles of crystalline polypropylene it may also be employed with advantage in improving products made from other crystallizable hydrocarbon polymers, particularly alpha-olefin polymers and copolymers. Specific examples are linear polymers of ethylene, 1-butene, 4-methyl-1-pentene, and 1-hexene, crystalline copolymers of propylene with ethylene, 1-butene and the like, and crystalline polystyrene. Particularly desirable improvements are obtained, for example, in block polymers, such as those consisting predominantly of isotactic polypropylene having small amounts of ethylene, e.g., between 1 and 10 percent, copolymerized therewith by block polymerization. A preferred group are isotactic polymers of alpha-monoolefin having at least 3 and up to 8 carbon atoms per molecule. Polymers of alpha-monoolefins having from 2 to 4 carbon atoms are another preferred group. Polymers which can be improved according to this invention have molecular weights and crystallinites in the range described above for polypropylene.

In one mode of practicing this invetnion, elastomeric polymer is added to the polyolefin as a property-modifying additive, together with a carboxylic acid salt. The addition of elastomers is known to confer an improvement in some of the mechanical properties of crystalline polymers, e.g., the impact strength. Suitable elastomers in general are predominantly amorphous polymeric materials having a glass point below 10° C., measured according to ASTM test D1043–51. Suitable elastomers include copolymers of ethylene with alpha olefins such as propylene or 1-butene, or other elastomeric olefin copolymers, and amorphous homopolymers of monoolefins, such as amorphous polypropylene. Other elastomers may be used, such as natural rubber, polyisobutylene, Butyl rubber, butadiene-styrene coplymer (SBR), butadiene-acrylonitrile copolymer (NBR), polybutadiene or polyisoprene, particularly those of high cis-1,4 content, silicone rubbers, and the like. The elastomers which are added preferably have weight average molecular weights in excess of 50,000, suitably from 100,000 to 500,000. Elastomer may be added in concentrations up to 35 percent by weight, preferably between 3 and 15 percent. Use of aluminum salts together with elastomers provides polymer of improved properties, particularly low temperature (0° C.) impact resistance.

The polymers which are modified according to this invention are produced by polymerizing propylene or other suitable olefins by contact with a highly stereospecific catalyst system. A great variety of stereospecific catalysts have been described in the literature. They are generally species or modifications of the so-called Ziegler catalysts or Natta catalysts.

The Ziegler-type catalysts may be designated "metal alkyl-reducible metal halide type", and the Natta type catalysts "performed metal subhalide type". This terminology is used, for example, in "Poylolefin Resin Processes" by Marshall Sittig, Gulf Publishing Company, Houston, Texas, 1961. These well-known catalysts are the reaction products of halides, in order of preference chlorides and bromides, of transition metals from sub-groups $b$ of groups 4 and 5 of the Mendeleev Periodic Table, as illustrated on page 28 of Ephraim, "Inorganic Chemistry", 6th English edition, i.e., of Ti, Zr, Hf, Ti, V Nb or Ta, with organometallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystallizable alpha olefin polymers, the reaction mixture formed in the low pressure polymerization is treated to deactivate the catalyst, usually by contact with a polar compound such as an alcohol and/or hydrochloric acid, an is subsequently washed for removal of at least a substantial portion of the catalyst residue. The resulting polymer almost invariably contains at least traces of the catalyst residue. Typically it may contain 50 to 500 parts per million (p.p.m.) of each of the catalyst components, calculated as the corresponding metal. A carefully purified polymer may contain as little as 1 p.p.m. of each metal or less. The additives of this invention are uniquely useful in polymers which contain relatively low amounts of the residue of said catalyst compounds, e.g., less than 50 p.p.m. calculated as the corresponding metal, and especially in those containing from 0 to 10 p.p.m., for example, 2 p.p.m. as illustrated in Examples I–III. However, they provide equally good results when used in polymers containing large amounts of catalyst residue.

When the polymer substrate to which the additive of this invention is added contains a substantial amount of a compound of an alkali metal or alkaline earth metal having an anion which is not derived from one of the above-grouped effective acids, it is sometimes necessary to use the additive in larger amounts than would be necessary in the absence of said alkali or alkaline earth metal compound. The amount of additive added must be increased by the amount which is made ineffective by metathesis with said alkali metal or alkaline earth metal compound. Such metathesis is not generally complete. At most, the amount of additive will have to be increased by an amount stoichiometrically equivalent to said alkali metal of alkaline earth metal compound. The effective amount is easily determined. Alkali metal and alkaline earth metal salts are not usually present in Ziegler or Natta type olefin polymer. However, at times salts of such metals, e.g., calcium stearate, are added to neutralize residual acidity in polymer. The amount added is then precisely known and can be easily compensated for. Alternatively one could select a calcium salt of one of the acids whose aluminum salts are effective in this invention. Metathesis would then not affect the effectiveness of the added aluminum salt.

According to the preferred mode of this invention, compositions of polyolefins with aluminum salts of carboxylic acids are prepared by combining in the presence of finely divided polymer or of molten polymer one of said aluminum compounds and one of said carboxylic acids or its anhydride or its ammonium salt.

The carboxylic acids and the aluminum compounds are preferably mixed in the form of separate suspensions with a suspension of the polymer; the resultant mixture is then completely or substantially completely freed from liquid. The suspension media may be water or an organic liquid suitable for the purpose. The choice of medium is also determined by the nature of the aluminum compound to be added.

The suspension of the aluminum compound to be added may be the reaction mixture obtained when this compound is prepared in an aqueous medium or a liquid organic medium. The solid material present in this reaction mixture may first be isolated, washed, if desired, then again suspended.

When the aluminum compound to be added is an aluminum hydroxide use may be made, for example, of the aqueous suspension obtained when this compound is prepared from $Al_2(SO_4)_3$ and NaOH in water.

An aqueous suspension of the polymer may be prepared for instance by suspending the macromolecular substance in a dry state in water by means of wetting a agent. The starting material, however, is preferably not a polymer which has already been dried, but the aqueous polymer and/or copolymer suspension used in the suspension obtained when a steam treatment is used in the processing of the predominantly crystalline polymer for the purpose of completely removing the liquid organic medium used in the polymerization. In this treatment the steam is contacted with a mixture of polymer, organic liquid and water obtained by mixing the polymer cake still containing organic liquid with water and a wetting agent.

It is also possible to mix the suspensions of the aluminum compound to be added and/or of the carboxylic acid to be added with the polymer cake still containing liquid, e.g., the moist polymer cake, which is obtained by mechanically separating the aqueous polymer suspension derived from the steam treatment, for instance, by spraying the suspension to be added on this cake.

An attractive method of incorporating the aluminum compound in the polymer is one in which this compound is prepared in a liquid medium in which the predominantly crystalline polymer and/or copolymer has previously been suspended, usually with the use of a wetting agent, the resultant mixture being subsequently completely or substantially completely freed from liquid. The advantage of this in situ preparation is that the aluminum compounds added precipitate on the polymer particles in very finely divided form, thereby insuring a very intimate intermixing of these substances. In the case of an aluminum hydroxide, for example, the in situ preparation of the aluminum compound to be added may be readily effected in the above-mentioned aqueous polymer suspension obtained after the steam treatment. It is also possible first to isolate the polymer, for instance, by centrifuging, if necessary to wash it with water and subsequently to suspend the moist cake again in the presence of a wetting agent before the in situ preparation of the aluminum compound is carried out.

It is essential for effective results that a substantially homogeneous distribution of the combined additive in the molten polymer be obtained prior to the final crystallization of the polymer. To promote mixing of the polymer and the additive, it is best to apply mechanical mixing at temperatures at which the polymer has a relatively low viscosity, i.e., a temperature exceeding the melting temperature of the polymer by from 20° to 150° C. These conditions are of particular importance if products of highly improved transparency are desired.

The additives may be present in the polymer melt in true solution or in uniform dispersion, e.g., as colloidal suspensions of liquids or solids. The desired effectiveness is obtained when they are present as solids of from 0.01 to less than 1 micron diameter.

The manner in which the additives are combined with polymer provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

An essential step in the process according to this invention is the cooling of the polymer containing the basic aluminum salts as additive at conditions resulting in a crystalline polymer structure. The final cooling step in the production of a shaped article determines those of its effective properties which depend on crystal structure. Whereas in the absence of crystallization modifying additives slow cooling leads to formation of excessively larger spherulites, and rapid cooling tends to lead to incompletely crystallized polymer, i.e., polymer having a lower degree of crystallinity than it is capable of achieving, the use of additives of this invention generally result in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

Shaped articles from product according to this invention may be, for example, bars, sheets, films, bands, granules, rods or flakes, molded or extruded, large or small shapes or filament. Shaped articles according to this invention may be manufactured from the mixtures according to this invention by casting, compression molding or injection molding; films may be obtained by blowing or by slit extrusion; filaments, bars, bands and the like, may be obtained by extrusion. If desired these can be reduced, by chopping, to the form of granules, chips or the like. Filaments can be stretched to obtain further improvement of properties. Other known methods of forming shaped polyolefin articles are equally adapted to use with mixtures according to this invention.

The invention will be further described by reference to the following examples, which are not to be interpreted as limiting the invention but are merely intended to be illustrative of preferred modes of practicing the invention.

EXAMPLE I

Powdery isotactic polypropylene is prepared in a medium of technical isooctane from a mixture of gamma-titanium trichloride and aluminum diethyl chloride as catalyst-forming components. This polymer has a melt index of 1.0, an a intrinsic viscosity (measured in decahydronaphthalene at 135° C.) of 3.9 and a solubility in cold hexane of 6% by weight. The polymer contains only $2 \times 10^{-4}\%$ by weight (2 p.p.m.) of aluminum.

1600 grams of this polypropylene powder is wetted with 15 liters of a 5% by weight solution of acetone in water. In a period of 5 minutes a solution of 6.12 grams (0.018 mole) $Al_2(SO_4)_3 \cdot 15H_2O$ in 100 ml. water and 2.40 grams (0.06 mole) NaOH also in 100 ml. water is added with intensive stirring to the said mixture and stirring thereafter continued for 10 minutes. The solid substance is then separated off by centifuging and dried under nitrogen at 60° C. The resultant powdery product consists of polypropylene incorporating 0.5% by weight of aluminum hydroxide in a very homogeneous and very finely divided state.

0.15% by weight of 4,4'-thio-bis(6-tert-butyl metacresol), 0.6% by weight of dilauryl thiodipropionate and 8 grams (0.04 mole) of a para-tert-butyl benzoic acid are added at normal temperature to samples of the resulting aluminum hydroxide containing polypropylene powder. Samples of the resultant powdery mixtures and of unmodified polypropylene are milled for 5 minutes at 180° C. From the hides thus obtained, 6.25 mm. sheets and also 1 mm. sheets are then pressed at 280° C. From the 6.25 mm. sheets, in accordance with the British Standard Specification for determining the Izod impact resistance, rods are cut by means of which this impact resistance is determined at 20° C. The 1 mm. sheets are used for measuring the yield stress and depolarization.

Depolarization measurements are made for assessing clarity and are carried out in the following manner.

A piece of approximately 2 mg. of a 1 mm. sheet obtained in the manner described above is pressed out between a cover glass and a slide at approximately 200° C. to a layer of 0.04 mm. The polymer is then crystallized by cooling the preparation in air. The resultant microscopic preparation is observed in a polarization microscope between crossed polarizers. A photomultiplier is substituted in the eyepiece tube for the eyepiece and the light intensity falling on the photomultiplier measured. Care is taken that the part of the preparation to be measured is free from orientation double refraction.

The apertures of the condenser are so adjusted that the meter of the photomultiplier shows a light intensity of 100 for the measurement of a standard preparation. Any preparation may be used as a standard preparation provided that the path difference measured thereon is less than ¼λ of the type of light used.

The preparation to be assessed is then measured, the optical system of the microscope remaining unaltered and the deflection of the meter indicating the depolarization value Δ.

The results of the said measurements are given in Table I below.

TABLE I

|  | Yield Stress, kg./sq. cm. | Izod Impact Resistance at 20° C. kg.-cm./sq. cm. | Depolarization Δ |
|---|---|---|---|
| Mixture free from aluminum hydroxide and carboxylic acid | 326 | 6.4 | 150 |
| Mixture obtained with the use of 0.5% by weight of aluminum hydroxide and 0.5% by weight of paratert-butyl benzoic acid | 330 | 10 | 15 |

EXAMPLE II

The starting material is a polypropylene powder prepared from a mixture of gamma-titanium trichloride and aluminum diethyl chloride as catalyst and having a melt index of 3.0 and an intrinsic viscosity (measured in decahydronaphthalene at 135° C.) of 2.9. The polymer contains only $2 \times 10^{-4}\%$ by weight (2 p.p.m.) of aluminum.

To samples of this polypropylene are added at normal temperature 0.15% by weight of 4,4'-thio-bis(6-tert-butyl metacresol), 0.6% by weight of dilauryl thiodipropionate and also 0.1% by weight of para-tert-butyl benzoic acid and 0.5 % by weight of aluminum triisopropoxide. The powdery mixture ore milled for 5 minutes at 180° C. From the hides thus obtained, 6.25 mm. sheets and also 1 mm. sheets are then pressed at 280° C. From the 6.25 mm. sheets, in accordance with the British Standard Specification for determining the Izod impact resistance, rods are cut by means of which this impact resistance is determined at 20° C. The 1 mm. sheets are used for measuring the haze and the yield stress.

The haze is evaluated by means of an apparatus consisting of a closed black box equipped with a photoelectric cell and a positive lens at a distance of 45 cm. in front of the photoelectric cell. In front of the lens is an aperture and in front of the aperture at the focal point of the lens is mounted a light source. A parallel beam of light is thrown on to the opening of the photoelectric cell via the aperture and the lens. The opening of the photoelectric cell and the beam of light both have a diameter of 2.5 cm. The photoelectric cell is connected to a galvanometer in which there is no current if a metal plate is placed directly in front of the opening of the photoelectric cell (position 1) or directly behind (i.e., on the photoelectric cell side of) the lens (position 2) or if the light source is switched off.

In measuring the haze, each sheet is placed first in position 1 and then in position 2, the galvanometer readings $T_1$ and $T_2$ taken in these positions being recorded. The value of the haze is calculated from the formula $$\frac{T_1 - T_2}{T_1} \times 100$$

It should be borne in mind that the haze of articles manufactured by injection molding is invariably considerably lower than that of extruded articles.

The results of the said measurements are given in Table II.

TABLE II

|  | Yield Stress, kg./sq. cm. | Izod Impact Resistance at 20° C., kg. cm./sq. cm. | Haze, $\frac{T_1 - T_2}{T_1} \times 100$ |
|---|---|---|---|
| Mixture free from Al-triisopropoxide and carboxylic acid | 365 | 4.5 | 92 |
| Mixture obtained by addition of 0.1% by weight of p-tert-butyl benzoic acid and 0.5% by weight of Al-triisopropoxide | 373 | 7.4 | 74 |

EXAMPLE III

The staring material is a polypropylene powder prepared from a mixture of gamma-titanium trichloride and aluminum diethyl chloride as catalyst and having a melt index of 0.2 and an intrinsic viscosity (measured in decahydronaphthalene at 135° C.) of 5.3. The aluminum content of the polymer is $2 \times 10^{-4}\%$ by weight (2 p.p.m.).

To samples of this polypropylene are added at normal room temperature 0.15% by weight of 4,4'-thio-bis(6-tert-butyl metacresole), 0.6% by weight of dilauryl thiodipropionate and in some experiments also 0.1% by weight of para-tert-butyl benzoic acid and also 0.5% by weight of aluminum triisopropoxide.

In addition, two rubber-like ethylene-propylene copolymers having respective average molecular weights of 123,000 and 360,000 are used as components. The amount in which these copolymers are used is 10% by weight, based on polypropylene.

After hides have been made from the ethylene-propylene copolymers, the aforesaid polypropylene-containing mixtures are added thereto on the mill, after which the milling temperature is increased to 180° C. and milling continued at this temperature for 5 minutes. From the hides thus obtained, 6.25 mm. sheets and 1 mm. sheets are then pressed at 280° C. From the 6.25 mm. sheets, in accordance with the British Standard Specification for determining the Izod impact resistance, rods are cut by means of which this impact resistance is determined at 0° C. and 20° C. The 1 mm. sheets are used for measuring the yield stress.

The impact resistance and yield stress of mixtures not containing the copolymer are determined in a similar way.

TABLE III

| Carboxylic Acid Salt | Copolymer | | Yield Stress, kg./sq. cm. | Izod Impact Resistance, kg. cm./sq. cm. | |
|---|---|---|---|---|---|
|  | Mol. Weight 123,000 | Mol. Weight 360,000 |  | 0° C. | 20° C. |
| − | − | − | 334 | 2.1 | 7.9 |
| + | − | − | 344 | 2.2 | 16 |
| − | + | − | 293 | 6.6 | 18.5 |
| + | + | − | 294 | 13 | >50 |
| − | − | + | 276 | 12.1 | >46.5 |
| + | − | + | 278 | 23 | >50 |

We claim as our invention:
1. The method of crystallizing a crystallizable polyolefin which comprises
   (A) admixing
      (a) powdered polyolefin containing no more than 10 p.p.m., measured as metal, of catalyst residue,

(b) an aluminum compound reactive with carboxylic acids to form salts thereof, in an amount to provide at least 0.0005 percent by weight of aluminum, based on polyolefin, and
(c) about a stoichiometric equivalent of a carboxylic acid from the following group
   (1) monocarboxylic acids whose carboxyl group is attached to a ring carbon atom;
   (2) polycarboxylic acids having at least four carbon atoms and at least two carboxyl groups per molecule;
   (3) carbocyclic ring - substituted aliphatic monocarboxylic acids having the carboxyl group attached to a terminal carbon atom;
(B) melting and mechanically working the resulting admixture at a temperature of from 20° to 150° above the melting point of said polyolefin, and
(C) solidifying the melt by cooling it.

2. A method according to claim 1 wherein said polyolefin is a polymer of an alpha-monoolefin having from 2 to 8 carbon atoms per molecule.

3. A method according to claim 1 wherein said polyolefin is polypropylene.

4. The method of crystallizing crystallizable polypropylene which comprises
(A) admixing
   (a) crystallizable polypropylene powder containing no more than 10 p.p.m., measured as metal, of catalyst residue,
   (b) an aluminum alkoxide in an amount sufficient to provide at least 0.005 percent by weight of aluminum, based on polypropylene, and
   (c) about a stoichiometric equivalent of a carboxylic acid from the following group:
      (1) monocarboxylic acids whose carboxyl is attached to a ring carbon atom;
      (2) polycarboxylic acids having at least four carbon atoms and at least two carboxyl groups per molecule;
      (3) carbocyclic ring - substituted aliphatic monocarboxylic acids having the carboxyl group attached to a terminal carbon atom;
(B) melting and mechanically working the resulting admixture at a temperature of from 20° to 150° above the melting point of said polypropylene, and
(C) solidifying the melt by cooling it.

5. A method according to claim 4 wherein said carboxylic acid is a monocarboxylic acid containing a carboxyl group and a hydrocarbon group substituent, both attached to a benzene nucleus.

6. A method according to claim 5 wherein said carboxylic acid is p-tert-butyl benzoic acid.

7. A method according to claim 4 wherein said carboxylic acid is an alkanedioic acid having from 4 to 10 carbon atoms per molecule.

8. A method according to claim 7 wherein said carboxylic acid is succinic acid.

9. A method according to claim 4 wherein said carboxylic acid is a carbocyclic dicarboxylic acid having both carboxyl groups attached to a single ring.

10. A method according to claim 7 wherein said dicarboxylic acid is adipic acid.

11. A method according to claim 4 wherein said carboxylic acid is a carbocyclic ring-substituted aliphatic monocarboxylic acid having the carboxyl group attached to a terminal carbon atom.

12. A method according to claim 11 wherein said carboxylic acid is diphenyl acetic acid.

13. A method according to claim 4 in which said aluminum alkoxide is aluminum triisopropoxide.

14. The method of crystallizing crystallizable polypropylene which comprises
(A) admixing
   (a) an aqueous suspension of powdered polypropylene containing no more than 10 p.p.m., measured as metal, of catalyst residue,
   (b) an aluminum compound selected from the group of aluminum hydroxides and aluminum salts of acids weaker than the hereinafter referred to carboxylic acid, and
   (c) about a stoichiometric equivalent, based on said aluminum compound, of a carboxylic acid salt from the following group:
      (1) monocarboxylic acids whose carboxyl group is attached to a ring carbon atom;
      (2) polycarboxylic acids having at least four carbon atoms and at least two carboxyl groups per molecule;
      (3) carbocyclic ring - substituted aliphatic monocarboxylic acids having the carboxyl group attached to a terminal carbon atom;
(B) recovering the resulting admixture free of water,
(C) melting and mechanically working the resulting admixture at a temperature of from 20° to 150° above the melting point of said polypropylene, and
(D) solidifying the melt by cooling it.

15. A method according to claim 1 wherein said polyolefin contains no more than about 2 p.p.m., measured as metal, of catalyst residue.

16. A method according to claim 1 wherein said polyolefin is free of catalyst residue.

17. A method according to claim 4 wherein said polypropylene contains no more than about 2 p.p.m., measured as metal, of catalyst residue.

18. A method according to claim 4 wherein said polypropylene is free of catalyst residue.

19. A method according to claim 14 wherein said polypropylene contains no more than about 2 p.p.m., measured as metal, of catalyst residue.

20. A method according to claim 14 wherein said polypropylene is free of catalyst residue.

References Cited by the Examiner
UNITED STATES PATENTS

| | | | |
|---|---|---|---|
| 3,130,186 | 4/1964 | Siggel et al. | 260—94.9 |
| 3,207,735 | 9/1965 | Wijga | 260—94.9 |
| 3,207,737 | 9/1965 | Wales | 260—94.9 |
| 3,207,738 | 9/1965 | Wijga | 260—94.9 |

JOSEPH L. SCHOFER, *Primary Examiner.*

L. EDELMAN, *Assistant Examiner.*